United States Patent [19]
Avera

[11] 3,775,921
[45] Dec. 4, 1973

[54] INSULATED PANEL JOINT ASSEMBLY

[75] Inventor: William W. Avera, Winston-Salem, N.C.

[73] Assignee: The Bahnson Company, Winston-Salem, N.C.

[22] Filed: June 2, 1972

[21] Appl. No.: 259,229

[52] U.S. Cl. .................................. 52/471, 52/573
[51] Int. Cl. ........................... E04d 1/36, E04b 1/66
[58] Field of Search ...................... 52/471, 582, 586, 52/395, 403, 472; 160/392, 395

[56] References Cited
UNITED STATES PATENTS
3,090,646   5/1963   Johnson ............................. 160/392
3,363,383   1/1968   La Barge ............................. 52/471

Primary Examiner—John E. Murtagh
Attorney—Thomas B. Van Poole et al.

[57] ABSTRACT

A panel joint assembly including a pair of laminated sandwich type panels each having an insulative core and a pair of facing sheets, a pair of channel members nested in rabbets in adjacnt edges of the panels having outwardly opening constricted entrances, and an elastomeric joining strip having a pair of truncated wedge shaped marginal flange formations seated in said channel and an interconnecting, integral web portion of U-shaped cross-sectional configuration extending therebetween. The flange formations have outwardly opening re-entrant recesses having an enlarged inner portion filled with an elastomeric locking cord of like cross-section to maintain the flange formations tightly seated in the channel members.

11 Claims, 3 Drawing Figures

PATENTED DEC 4 1973

3,775,921

INSULATED PANEL JOINT ASSEMBLY

BACKGROUND AND OBJECTS OF THE INVENTION

The present invention relates in general to joint structures for the joining of panels wherein components of the panels are subject to expansion and contraction with changes in temperatures, and more particularly to the provision of a joint structure employing a resilient compressible elastomeric material forming a joining strip between channel formations at the edges of sandwich type insulated module panels for securing the panel edges together at a marginal edge joint.

Laminated sandwich type insulated module panels have been experiencing wide acceptance in the building and construction field, particularly as assembled walls for enclosures subjected to substantial variations in temperature and to significant differences in temperature at the inner and outer surfaces of the building walls. For example, laminated sandwich type module panels having metal skins or liner sheets secured to or covering opposite surface areas of cellular honeycomb and/or foamed polymeric core materials have been widely used in the building and construction field. Insulated module panels comprising aluminum or aluminum alloy liner sheets or skins which are coextensively adhered to or cover opposite major surface areas of expanded polystyrene or urethane foam material, in panel sizes suitable for rapid construction of buildings from modular sections, for example in sizes approximately five feet by sixteen feet, have been widely accepted for enclosing refrigerated areas such as freezer warehouses, freezer rooms, refrigerated compartments within existing buildings, and in providing enclosures for factory assembled, integrated refrigerating or air conditioning units. Avoidance of vapor and/or moisture transmission through the joints between the module panels employed in the construction and erection of such building structures and accommodation to dimensional changes in the components arising from temperature variations are design problems which have received attention of designers of such structures. Since metallic skins or liners are customarily provided to cover the inner and outer sides of the rigid polymeric core material, the joint must be sufficiently resilient to accommodate substantial thermal expansion and contraction of the metallic skin material and yet the joint must be made air tight to provide an effective enclosure for refrigerated areas. Typical examples of resilient flexible elastomeric joining strips which have been previously proposed for use in joining such insulated module panels are found in U. S. Pat. Nos. 3,363,383, 3,232,395 and 3,421,276 each issued to Robert L. LaBarge.

An object of the present invention is the provision of an improved panel joining assembly for insulated module panels, having a joining strip of relatively simple configuration and using rigid channel extrusions to fit flanges at the edges of the metal skins for the panels in a manner providing an effective water and pressure tight seal while accommodating the usual thermal expansion encountered in such structures.

Another object of the present invention is the provision of a novel panel joining assembly for insulated module panels formed of metallic skins covering polymeric foam cores or the like, comprising a pair of channel members interfitting with acute angle flanges formed at the marginal edges of the metal skins for each module panel, together with a flexible elastomeric joining strip having enlarged portions which interfit in the channels with the panel skin flanges, the joining strip having a recess for receiving a locking cord therein for removably retaining the panels in joined condition with the marginal flanges of the panel skins restrained in the channels.

Other objects, advantages and capabilities of the present invention will become apparent from the following detailed description, taken in conjunction with the accompanying drawing illustrating a preferred embodiment of the invention.

DETAILED DESCRIPTION OF A PREFERRED EMBODIMENT

Figure 1:
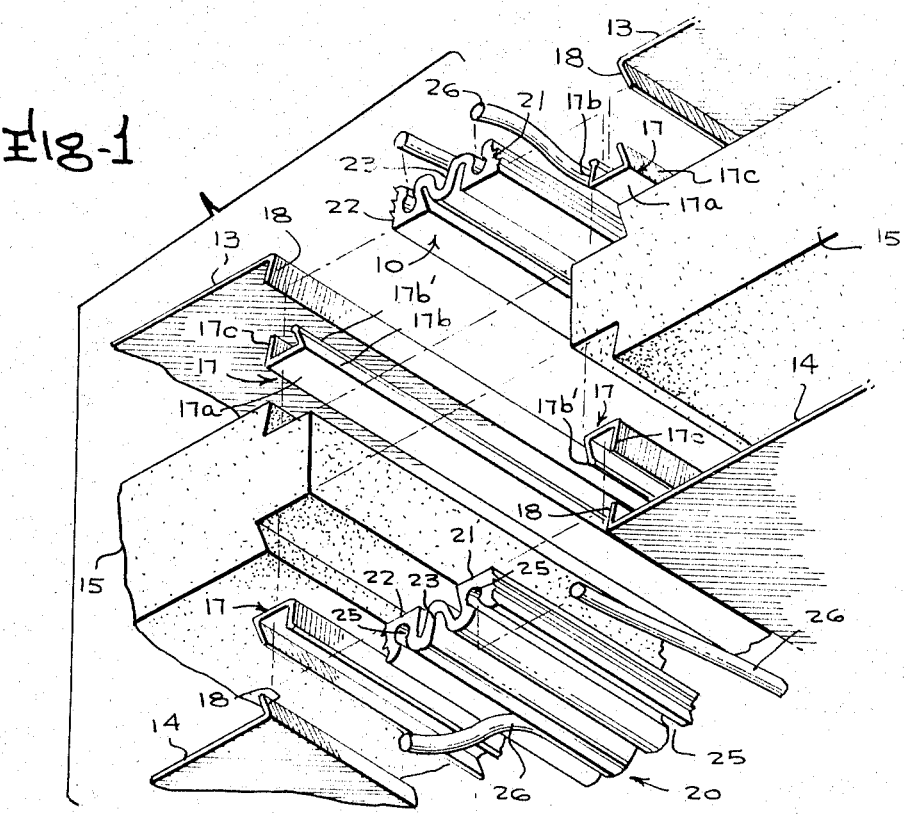
FIG. 1 is an exploded fragmentary perspective view of the components of the panel joining assembly of the present invention.

Referring to the drawing, wherein like reference characters designate corresponding parts throughout the several figures, there is illustrated a panel joint assembly, generally indicated by the reference character 10, for the joining of two panels, designated by reference characters 11 and 12, which may be generally described as panels of the insulated module type, each formed, for example, of inner and outer skins or liners 13, 14 and an intervening rigid core 15 such as foamed-in-place urethane or polystyrene foam board. In one preferred example, the outer facing, skin or liner 13 may be of 0.032 inch aluminum while the inside facing or skin 14 may be of 22 gauge galvanized steel or stainless steel.

The rigid core 15 is provided with rabbets or right angular recesses 16 at the inner and outer marginal edges of the core 15 whereby, when the marginal edges 15a of the cores 15 of two adjacent panels are placed in abutment with each other, the right angular recess portions collectively define an outwardly facing U-shaped channel and an inwardly facing U-shaped channel symmetrical with the plane of contact between the two panel cores.

Figure 2:
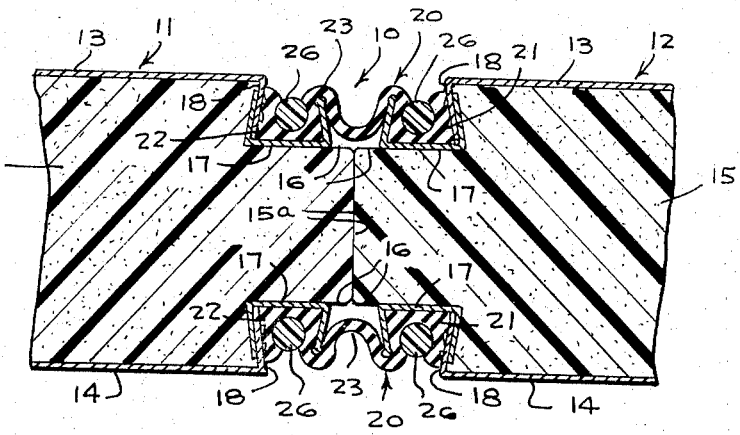
FIG. 2 is a fragmentary transverse section view of a joint structure incorporating the present invention.
Figure 3:
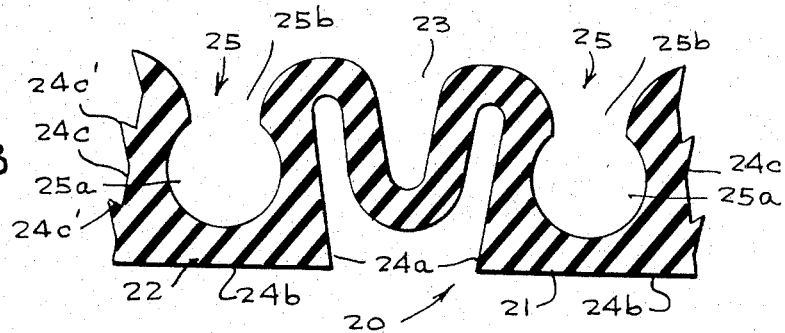
FIG. 3 is an enlarged section view of the joining strip.

The recesses 16 at the marginal edges of the panel cores are designed to receive a pair of laterally spaced extruded channels 17 which are spaced apart laterally from each other when seated in the corner portions of the recesses 16 in the manner illustrated in FIG. 2. In one practical example, the channel extrusions 17 may have a base 17a which is about 0.412 inches wide at its inner surface, a first channel side or leg 17b which extends about 0.279 inch from the outwardly facing surface of the base 17a to the free upper edge thereof and terminates in a bead 17b' at the free upper edge, and a second channel side or leg 17c which extends about 0.350 inch from the base 17a, with the two channel sides 17b and 17c converging inwardly at angles of about nine and a half degrees from the plane perpendicular to the surface of the base 17a. The upper end portion of the second channel side 17c of each of the channels 17 is lapped by an edge flange or lip 18 on each edge of the skins or facings 13, 14 bent at an acute angle, for example of about 80°, to the plane of the associated skin or facing 13, 14. The edge flanges 18 extend the major portion of the distance from the outer edge of the second side 17c to the base 17a of the channel, as illustrated in the drawing.

The panel assemblies comprising the rigid core 15 and the inner and outer skins or facings 13, 14, with the associated channels 17 in the recesses 16 at each of the opposite vertical edges of the panel, may be formed either by routing or cutting the recesses 16 in the vertical or longer edges of a board type of foam material for the core 15, after which the skins or facings 13, 14 and the channels 17 are adhered in position with a suitable adhesive material, or the skins or facings 13 and 14 and the associated channels 17 may be supported in a jig or mould and the foam material poured in place to complete the panel assembly.

The adjacent vertical edges of the panels or panel assemblies 11, 12 are then joined together by a flexible elastomeric joining strip, made of elastomeric material such as rubber in a weather resistant compound, having a pair of opposite marginal edge flange formations 21, 22 interconnected by an integral, substantially U-shaped corrugation or bellows portion 23. The two marginal edge flange formations 21, 22 are of somewhat truncated wedge shaped configuration, the outer surfaces 24a, 24b and 24c thereof defining a truncated triangular cross-section having an enlarged base wall 24b and an outer wall 24c having serrations or triangular ribs 24c' thereon. The truncated wedge shaped flange formations define dove tail type ribs sized to be resiliently interfitted into and correspond to the channel spaces in the channel members 17 when the lips or edge flanges 18 of the associated panel skins 13 and 14 are disposed within the channel members. The joining strip flange formations 21, 22 additionally have reentrant sockets or recesses 25 opening outwardly toward the exterior of the panels and comprising a base socket portion 25a of generally circular cross-section and a constricted entrance throat 25b. The panel joining assembly is completed by a locking cord 26, for example of circular cross-section, formed of an extrusion of weather resistant elastomeric material or similar weather resistant composition.

To join the vertical edges of an adjacent pair of panels 11, 12 by the above described panel joint assembly components, the adjacent edges of the panel cores 15 are placed in abutment with each other with the panels in a common vertical plane, to assume the position illustrated in FIG. 2, with the acutely inclined edge flanges 18 bent or roll formed into the adjacent channel members 17, and the dove tail shaped flange formation portions 21, 22 of the joining strip 20 are forced into the slots defined by the adjacent channel members 17. The entrance openings of the slots defined by the channel members 17 are narrower than the base portions of the channels and are narrower than the base portions 24b of the joining strip flange formations 21, 22 so that the latter must be resiliently deformed to force them into the slots of the channel members 17. The locking cord 26 is then forced or rolled by a suitable tool through the constricted throat portion 25b of the reentrant sockets 25 into the enlarged circular base portions 25a thereof, forcing and maintaining the outer wall portions 24c of the joining strip flange formations 21, 22 tightly against the edge flanges 18 of the adjacent panel skins 13 or 14, thus effectivelY sealing the assembly against entrance of water from rain, condensation and the like. The U-shaped corrugation or bellows portion 23 of the joining strip 20 also provides an effective weather seal and pressure seal across the panel joint while allowing for thermal expansion or contraction of the panel skins 13 or 14, for example caused by exposure to sun or extreme cold.

Because of the provision of the rounded bead 17b' on the free side or leg 17b of the channel members 17, the cutting tendency present in sheet metal of a roll formed shape is eliminated, reducing the chance of cutting the joining strip when the wedge shaped flange formations 21, 22 are forced into the slots defined by the channel members 17.

What is claimed is:

1. A resiliently secured and sealed panel and panel joint assembly comprising a pair of insulating sandwich panels each having an insulative rigid core positioned between a pair of facing sheets, the panels having a pair of adjacent edges in parallel abutment and having rabbets adjoining said edges collectively defining a channel shaped recess, a pair of laterally spaced channel members seated in outwardly opening relation in opposite corners of said recess each having a base wall and a pair of outwardly converging straight, planiform channel side walls defining a channel slot having a constricted entrance, the panel facing sheets adjacent said recess having inturned edge flanges extending into the channel slot of the adjacent channel member, a flexible compressible elastomeric joining strip having a pair of marginal flange formations seated in the channel slots of said pair of channel members and a flexibly deformable web portion integral with said flange formations and extending in a curved path therebetween, the flange formations each being of truncated triangular cross-section defining an enlarged flat base surface of wider dimension than the remainder of the flange formation serving as the leading surface during entry into the associated channel slot to confront and abut the base wall of the channel slot and each flange formation having a pair of side surfaces which join the base surface and progressively converge toward said web portion defining narrower neck portions located in said constricted entrance and joining said web portion, said flange formations each having a re-entrant recess extending throughout its length defining an enlarged inner recessed portion and a constricted entrance throat, and a locking cord member conforming substantially to the normal cross-sectional configurations of said inner recess portion moveable through said entrance throat and seated in the latter to maintain the flange formations in a configuration tightly engaging the surfaces thereof against confronting surfaces of the associated channel member and the edge flange located therein.

2. A panel and panel joint assembly as defined in claim 1, wherein said rigid core of said panels is of foamed polymeric organic material and said facing sheets are thin sheet metal and have planiform main portions in parallel planes, the edge flanges of said facing sheets extending at an acute angle from the main portions of said facing sheets.

3. A panel and panel joint assembly as defined in claim 1, wherein said rigid core of said panels is of poured urethane foam and said facing sheets are thin sheet metal and have planiform main portions in parallel planes, the edge flanges of said facing sheets extending at an acute angle from the main portions of said facing sheets.

4. A panel and panel joint assembly as defined in claim 1, wherein said rigid core of said panels is of polystyrene foam board and said facing sheets are thin sheet metal and have planiform main portions in parallel planes, the edge flanges of said facing sheets extending at an acute angle from the main portions of said facing sheets.

5. A panel and panel joint assembly as defined in claim 1, wherein said enlarged inner recess portion of the re-entrant recesses and said locking cord are each of substantially corresponding circular cross-section.

6. A panel and panel joint assembly as defined in claim 2, wherein said enlarged inner recess portion of the re-entrant recesses and said locking cord are each of substantially corresponding circular cross-section.

7. A panel and panel joint assembly as defined in claim 1, wherein said locking cord is of flexible, compressible elastomeric material and said cord and enlarged inner recess portion are of substantially corresponding size and cross-sectional configuration.

8. A panel and panel joint assembly as defined in claim 5, wherein said locking cord is of flexible, compressible elastomeric material.

9. A panel and panel joint assembly as defined in claim 1, wherein said web portion extends between the neck portions of said flange formations along a substantially U-shaped, serpentine path defining a bellows portion for accommodating thermal expansion and contraction of the panels while maintaining an air-tight and pressure-tight seal at the joint.

10. A panel and panel joint assembly as defined in claim 7, wherein said web portion extends between the neck portions of said flange formations along a substantially U-shaped, serpentine path defining a bellows portion for accommodating thermal expansion and contraction of the panels while maintaining the air-tight and pressure-tight seal at the joint.

11. A panel and panel joint assembly as defined in claim 8, wherein said web portion extends between the neck portions of said flange formations along a substantially U-shaped, serpentine path defining a bellows portion for accommodating thermal expansion and contraction of the panels while maintaining the air-tight and pressure-tight seal at the joint.

* * * * *